US012566078B2

(12) United States Patent
Kume et al.

(10) Patent No.: US 12,566,078 B2
(45) Date of Patent: Mar. 3, 2026

(54) MAP CREATION/SELF-LOCATION ESTIMATION DEVICE

(71) Applicant: Hitachi Astemo, Ltd., Hitachinaka (JP)

(72) Inventors: Hideyuki Kume, Tokyo (JP); Yuichi Komoriya, Hitachinaka (JP); Morihiko Sakano, Tokyo (JP); Hidehiro Toyoda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 337 days.

(21) Appl. No.: 18/249,273

(22) PCT Filed: Aug. 31, 2021

(86) PCT No.: PCT/JP2021/031926
§ 371 (c)(1),
(2) Date: Apr. 17, 2023

(87) PCT Pub. No.: WO2022/102216
PCT Pub. Date: May 19, 2022

(65) Prior Publication Data
US 2023/0400328 A1      Dec. 14, 2023

(30) Foreign Application Priority Data
Nov. 10, 2020      (JP) .................................. 2020-187515

(51) Int. Cl.
G01C 21/00 (2006.01)
(52) U.S. Cl.
CPC ................................. G01C 21/3841 (2020.08)
(58) Field of Classification Search
CPC ................ G01C 21/3841; G01C 21/30; G01C 21/3807; G01C 21/3848; G09B 29/10
See application file for complete search history.

(56) References Cited

U.S. PATENT DOCUMENTS

2013/0085637 A1      4/2013   Grimm et al.
2013/0218950 A1*     8/2013   Sakakihara ............. H04W 4/02
                                                              709/203

(Continued)

FOREIGN PATENT DOCUMENTS

JP            2011021917 A   *   2/2011
JP            2014034251 A   *   2/2014

(Continued)

OTHER PUBLICATIONS

Machine Translation of JP-2011021917-A (Year: 2011).*

(Continued)

*Primary Examiner* — Sahar Motazedi
(74) *Attorney, Agent, or Firm* — Foley & Lardner LLP

(57)      ABSTRACT

An object is to provide a map creation/self-location estimation device capable of estimating a location/attitude of an ego vehicle with high accuracy. The map creation/self-location estimation device includes a map creation unit 110 that creates, from an output of a sensor, a map including a travelling location of an ego vehicle and a point group, a required accuracy determination unit 120 that determines location/attitude estimation accuracy (required accuracy) required for self-location estimation in the next travelling, from the output of the sensor and the map created by the map creation unit 110, a data selection unit 130 that selects a point group included in the map from the map created by the map creation unit 110 and the required accuracy determined by the required accuracy determination unit 120, a map recording unit 140 that records, as a record map, a selection map including the point group selected by the data selection unit 130, the travelling location, and the required accuracy, and a self-location estimation unit 150 that estimates the current location/attitude of a vehicle on the record map by associating the record map recorded in the map recording unit 140 with a current map including the point group (Continued)

O POINT GROUP ACQUIRED BY FIRST EXTERNAL ENVIRONMENT SENSOR
□ POINT GROUP ACQUIRED BY SECOND EXTERNAL ENVIRONMENT SENSOR selected by the data selection unit 130 and the travelling location of the ego vehicle.

9 Claims, 11 Drawing Sheets

(56) References Cited

U.S. PATENT DOCUMENTS

| | | |
|---|---|---|
| 2020/0370915 A1 | 11/2020 | Yoshida |
| 2022/0178717 A1 | 6/2022 | Kume et al. |

FOREIGN PATENT DOCUMENTS

| | | |
|---|---|---|
| JP | 6022447 B2 | 11/2016 |
| JP | 2017-215199 A | 12/2017 |
| JP | 6456562 B1 | 1/2019 |
| JP | 2020-148694 A | 9/2020 |
| WO | WO-2019/180963 A1 | 9/2019 |
| WO | WO-2020/189079 A1 | 9/2020 |

OTHER PUBLICATIONS

Machine Translation of JP-2014034251-A (Year: 2014).*
International Search Report with English Translation and Written Opinion of International Patent Application No. PCT/JP2021/031926 dated Sep. 28, 2021 (9 pages).
Chinese Office Action issued in corresponding CN Patent Application No. 202180071554.9, dated Jun. 20, 2025 with English translation (16 pages).

* cited by examiner

○ POINT GROUP ACQUIRED BY FIRST EXTERNAL ENVIRONMENT SENSOR
□ POINT GROUP ACQUIRED BY SECOND EXTERNAL ENVIRONMENT SENSOR

○ POINT GROUP ACQUIRED BY FIRST EXTERNAL ENVIRONMENT SENSOR

□ POINT GROUP ACQUIRED BY SECOND EXTERNAL ENVIRONMENT SENSOR

○ POINT GROUP ACQUIRED BY FIRST EXTERNAL ENVIRONMENT SENSOR

□ POINT GROUP ACQUIRED BY SECOND EXTERNAL ENVIRONMENT SENSOR

○ POINT GROUP ACQUIRED BY FIRST EXTERNAL ENVIRONMENT SENSOR

□ POINT GROUP ACQUIRED BY SECOND EXTERNAL ENVIRONMENT SENSOR

○ POINT GROUP ACQUIRED BY FIRST EXTERNAL ENVIRONMENT SENSOR
□ POINT GROUP ACQUIRED BY SECOND EXTERNAL ENVIRONMENT SENSOR

MAP CREATION/SELF-LOCATION ESTIMATION DEVICE

TECHNICAL FIELD

The present invention relates to a map creation/self-location estimation device.

BACKGROUND ART

In order to expand an application range of an automatic driving and driving assistance system, it is important to acquire information from a map based on self-location estimation. However, for example, a map for a driving assistance system on an expressway is prepared, but a map on a general road or in a residential area such as a neighborhood of a house has not been prepared. On the other hand, PTL 1 discloses that "a method of the present invention relates to a method of assisting a driver of an automobile by using a driver assistance device of the automobile when the driver parks the automobile in a parking space, in particular, a parking space in which the automobile is parked daily, for example a garage. The driver assistance device has a learning mode and an operation mode. In the learning mode, while the vehicle is parked in the parking space by driving of the driver, the driver assistance device detects and stores reference data regarding the surroundings of the parking space by using a sensor device. In the learning mode, the driver assistance system further records a reference target location reached by the automobile during the learning mode. Data having information regarding the reference target location, particularly, information regarding the surroundings is stored. In the operation mode, the sensor device detects sensor data and compares the detected sensor data to the reference data. In accordance with the result of such comparison, the detected sensor data is used to recognize or identify the surroundings of the parking space and to determine the current location of the automobile with respect to the reference target location. In accordance with the current location of the automobile with respect to the reference target location, the driver assistance device determines a parking route, and the automobile is to be parked in the parking space from the current location along the determined route".

CITATION LIST

Patent Literature

PTL 1: JP 6022447 B

SUMMARY OF INVENTION

Technical Problem

In the related art disclosed in PTL 1, a map including data regarding surrounding objects and a travel route is self-created in the first travel, and the self-location (ego vehicle location) is estimated on a map created in the next or subsequent travel. In this manner, it is possible to realize automatic parking using the travel route included in the map. However, when data regarding surrounding objects acquired by a low accurate sensor/method is used for map creation, there is a problem that the accuracy of self-location estimation decreases. On the other hand, when the data regarding surrounding objects acquired by the low accurate sensor/method is not used for the map creation, there is a problem that the number of sections in which it is not possible to perform the self-location estimation increases because the available information decreases. Although automatic parking is assumed in PTL 1, in automatic driving and driving assistance required to operate in a wider range and under more various conditions, it is necessary to achieve both improvement in self-location estimation accuracy and expansion of a self-location-estimatable section.

The present invention has been made in view of the above circumstances, and an object of the present invention is to provide a map creation/self-location estimation device capable of estimating a location/attitude of an ego vehicle with high accuracy.

Solution to Problem

According to the present invention, a representative map creation/self-location estimation device includes a map creation unit that creates a map including a travelling location of an ego vehicle and a point group from pieces of information acquired by a plurality of sensors having different characteristics, the point group being a measurement result of a surrounding object of the ego vehicle, a required accuracy determination unit that determines required accuracy of location estimation of the ego vehicle at a predetermined point of the travelling location of the ego vehicle based on the pieces of information acquired by the sensors and the map, a data selection unit that selects, from the map, data of the map corresponding to the type of the sensor that measures the point group or a processing method, and creates a selection map in accordance with the required accuracy, a map recording unit that records the map as a record map, and a self-location estimation unit that estimates a current location of the ego vehicle in the record map by comparing the record map with the selection map created during travelling of the ego vehicle.

Advantageous Effects of Invention

According to the present invention, it is possible to realize a map creation/self-location estimation device capable of estimating a location/attitude of an ego vehicle with high accuracy.

Objects, configurations, and advantageous effects other than those described above will be clarified by the descriptions of the following embodiments.

DESCRIPTION OF EMBODIMENTS

Hereinafter, embodiments of the present invention will be described with reference to the drawings. In all the drawings for describing modes for carrying out the invention, parts having the same function may be denoted by the same reference signs, and repetitive description thereof may be omitted.

First Embodiment

A map creation/self-location estimation device according to a first embodiment will be described below with reference to FIGS. 1 to 10. Note that the map creation/self-location estimation device is configured as a computer including a processor such as a central processing unit (CPU), and a memory such as a read only memory (ROM), a random access memory (RAM), and a hard disk drive (HDD). Each function of the map creation/self-location estimation device is implemented by the processor executing a program stored in the ROM. The RAM stores data including intermediate data of calculation by a program executed by the processor. (Block Configuration)

Figure 1:
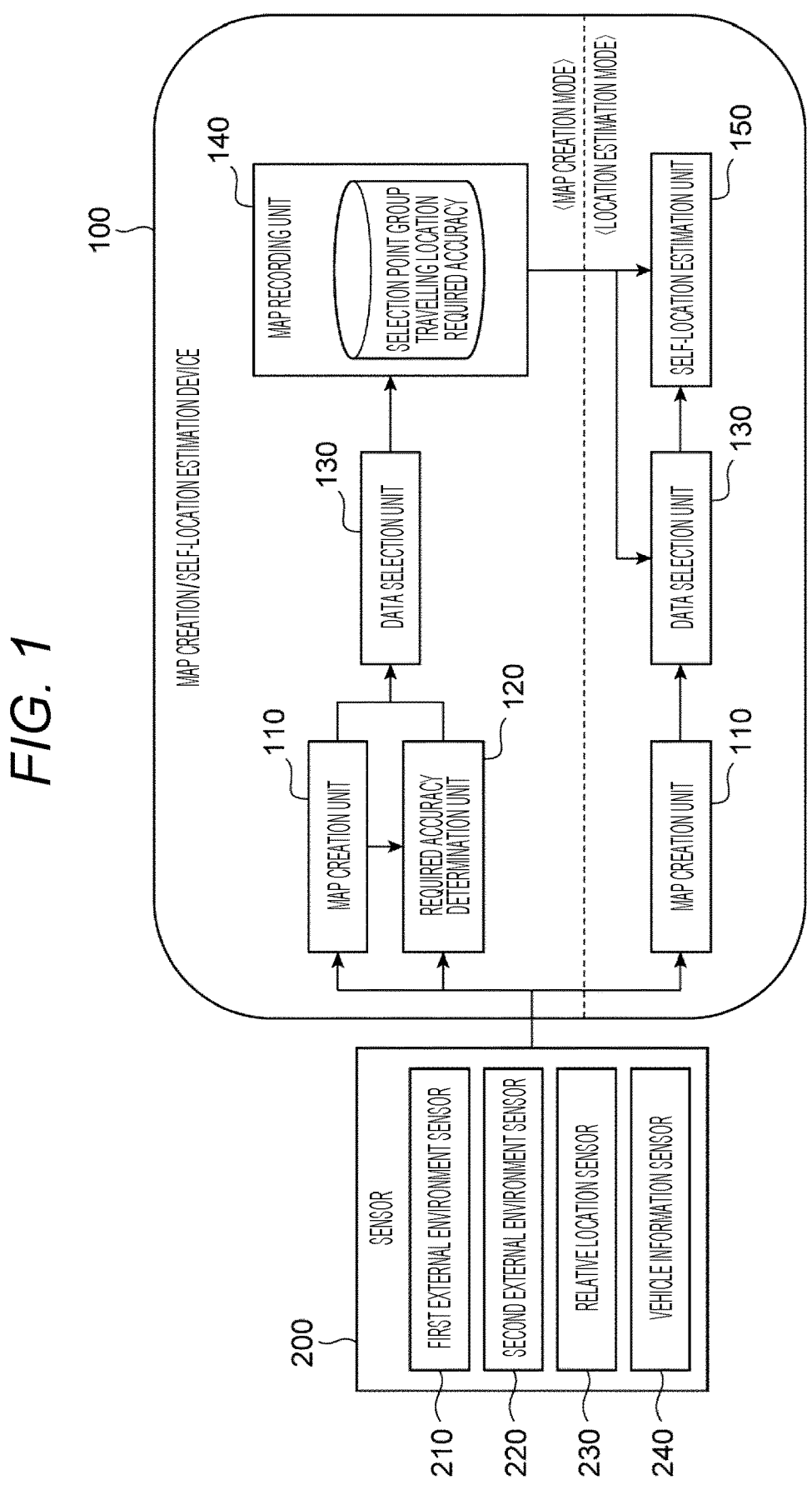
FIG. 1 is a diagram illustrating a block configuration of a map creation/self-location estimation device 100 according to a first embodiment.

FIG. 1 is a diagram illustrating a block configuration of a map creation/self-location estimation device 100 according to a first embodiment. The map creation/self-location estimation device 100 uses measurement data of a sensor group 200 (may be simply referred to as a sensor 200 below) as an input. The map creation/self-location estimation device 100 includes a map creation unit 110, a required accuracy determination unit 120, a data selection unit 130, a map recording unit 140, and a self-location estimation unit 150. The sensor 200 includes a first external environment sensor 210, a second external environment sensor 220, a relative location sensor 230, and a vehicle information sensor 240.

The operation of the map creation/self-location estimation device 100 includes a map creation mode and a location estimation mode. In the map creation mode, a map including a point group (a set of points obtained as a measurement result of an object around an ego vehicle) and a travelling location of the ego vehicle is created from the output of the sensor 200 and stored as a record map. In the location estimation mode, the current location/attitude of the ego vehicle on the record map is estimated from the output of the sensor 200 and the record map.

In the map creation mode, the map creation unit 110, the required accuracy determination unit 120, the data selection unit 130, and the map recording unit 140 operate. The map creation unit 110 creates a map including the point group and the travelling location of the ego vehicle from the output of the sensor 200. The required accuracy determination unit 120 determines location/attitude estimation accuracy (may be referred to as required accuracy below) required for self-location estimation in the next travel, from the output of the sensor 200 and the map created by the map creation unit 110. The data selection unit 130 selects a point group included in the map from the map created by the map creation unit 110 and the required accuracy determined by the required accuracy determination unit 120. The map recording unit 140 records, as the record map, a selection map including the point group selected by the data selection unit 130, the travelling location, and the required accuracy.

In the location estimation mode, the map creation unit 110, the data selection unit 130, and the self-location estimation unit 150 operate. The operations of the map creation unit 110 and the data selection unit 130 are the same as those in the map creation mode. However, the data selection unit 130 selects the point group included in the map by using the required accuracy recorded in the map recording unit 140 instead of the required accuracy determined by the required accuracy determination unit 120. The self-location estimation unit 150 estimates the current location/attitude of the vehicle on the record map by associating the current map with the record map recorded in the map recording unit 140. The current map includes the point group selected by the data selection unit 130 and the travelling location of the ego vehicle.

Note that, in the map creation mode, the map creation unit 110 operates online. That is, the map creation unit 110 performs processing for each input from the sensor 200. The required accuracy determination unit 120, the data selection unit 130, and the map recording unit 140 may operate online or may operate offline. For example, when the map creation mode is ended, the required accuracy determination unit 120, the data selection unit 130, and the map recording unit 140 may be operated only once. In the location estimation mode, the map creation unit 110, the data selection unit 130, and the self-location estimation unit 150 operate online.

Note that, in the present embodiment, the same (common) map creation unit 110 and data selection unit 130 operate in the map creation mode and the location estimation mode, but map creation units 110 and data selection units 130 which are different (separate) in the map creation mode and the location estimation mode may be prepared and operated. (Configuration of Sensor)

A configuration of the sensor 200 that inputs measurement data to the map creation/self-location estimation device 100 will be described. The sensor 200 includes a plurality of sensors (210, 220, 230, and 240) having different characteristics.

The first external environment sensor 210 and the second external environment sensor 220 are external environment sensors that are mounted on a vehicle (ego vehicle) and measure the environment around the vehicle. The external environment sensor is, for example, a monocular camera, a stereo camera, a LiDAR, a millimeter wave radar, sonar, or the like, and measures a three-dimensional location of an object around the vehicle. When a monocular camera is used, the acquired data is an image, and it is not possible to directly acquire the three-dimensional location. The three-dimensional location can be measured by using a plurality of images by a known motion stereo method or the like. In addition, by assuming the shape of the road surface, the three-dimensional location of a white line, a stop line, the crosswalk, and the like detected in the image may be estimated.

Measurement results of a plurality of external environment sensors are input to the map creation/self-location estimation device 100. In the present embodiment, an example in which measurement results of two external environment sensors having different characteristics, that is, the first external environment sensor 210 and the second external environment sensor 220, are input will be described. However, the number of external environment sensors is not limited to two, and measurement results of any number of two or more external environment sensors can be input. In addition, the first external environment sensor 210 and the second external environment sensor 220 include sensors having different processing methods for measurement results of the sensors in addition to sensors having different physical types. Thus, for example, three-dimensional location measurement by a motion stereo method from the image of the monocular camera may be used as the first external environment sensor 210, and three-dimensional location measurement by object recognition and road surface shape assumption from the image of the monocular camera may be used as the second external environment sensor 220. In this case, even though one type of sensors called a monocular camera are physically used, the processing methods for measuring the three-dimensional location are different from each other. Thus, the sensors is handled as external environment sensors having different characteristics in the present embodiment.

In the present embodiment, sonar is used as the first external environment sensor 210, and motion stereo for an image of a peripheral vision camera (monocular camera) is used as the second external environment sensor 220. The sonar and the peripheral vision camera are mounted on many vehicle types in a driving assistance/automatic driving system in a low speed range. Motion stereo for images of the sonar and the peripheral vision camera has a difference in characteristics that the sonar has high measurement accuracy of a three-dimensional location but a narrow measurable range, and the motion stereo for an image of the peripheral vision camera has a wide measurable range but low measurement accuracy of a three-dimensional location. However, the first external environment sensor 210 is not limited to the sonar, and the second external environment sensor 220 is not limited to the motion stereo for an image of the peripheral vision camera, and other external environment sensors may be used.

The relative location sensor 230 is a sensor that outputs a relative location of the ego vehicle. Similar to the external environment sensor, the relative location sensor 230 includes processing of estimating the relative location of the ego vehicle from the measurement result of the sensor. Here, the relative location represents a location/attitude by using, as a reference, a location/attitude of the vehicle at a certain time. For example, the relative location sensor 230 may be a known wheel odometry method for estimating the relative movement of the ego vehicle from the steering angle of the vehicle and the rotation amount of a tire. In addition, a known image odometry method or a LiDAR odometry method for estimating the relative movement of the ego vehicle from the measurement result of the camera or the LiDAR may be used.

The vehicle information sensor 240 is a sensor that acquires vehicle information such as a vehicle speed, a vehicle steering angle (corresponding to a driving operation amount of a driver), a shift location, and an operation status (described later) of a driving assistance system that supports a driving operation of the driver.

(Operation of Map Creation/Self-Location Estimation Device)

Contents of processing in each unit of the map creation/self-location estimation device 100 using measurement data of the sensor 200 as an input will be described with reference to FIGS. 2 to 10.

(Operation of Map Creation Unit)

First, contents of processing in the map creation unit 110 will be described with reference to FIGS. 2 and 3. The map creation unit 110 creates a map including the point group and the travelling location of the ego vehicle from the output (that is, pieces of information acquired by a plurality of sensors having different characteristics) of the sensor 200.

Figure 2:
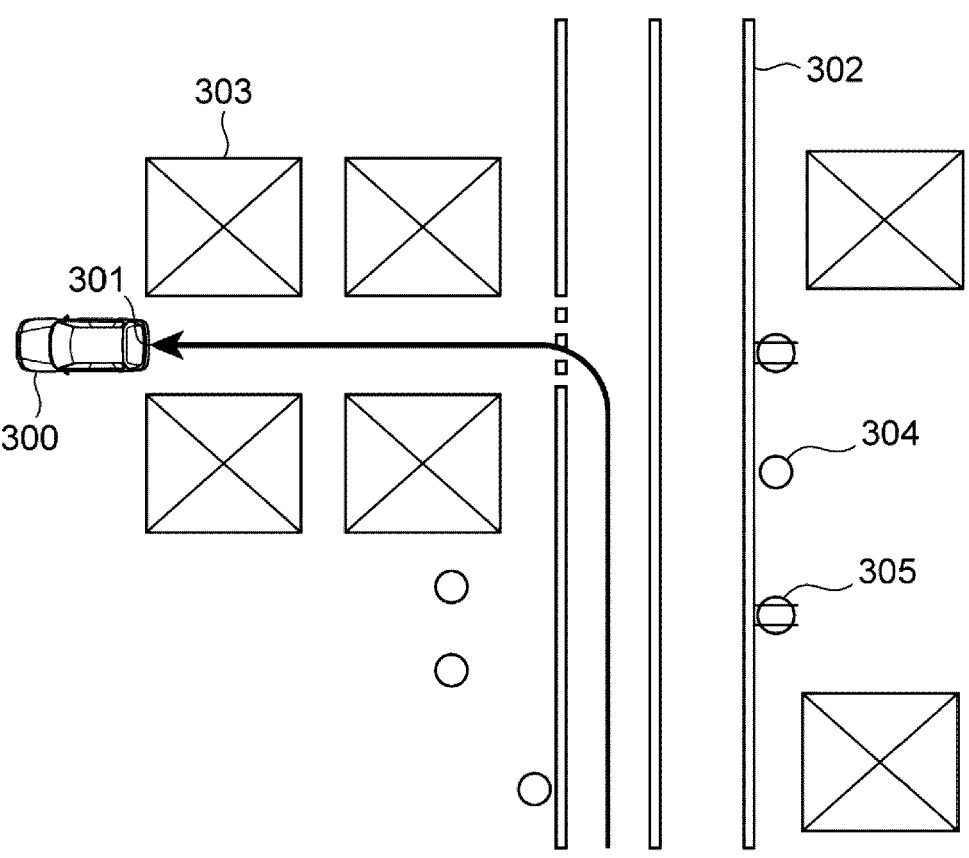
FIG. 2 is a diagram illustrating an example of an environment in which a vehicle has traveled.

FIG. 2 is a diagram illustrating an example of an environment in which the vehicle has traveled. A vehicle 300 travels along a travelling location (travelling route) 301, and objects such as a lane division line 302, a building 303, a tree 304, and an electric pole 305 exist around the travelling location 301.

Figure 3:
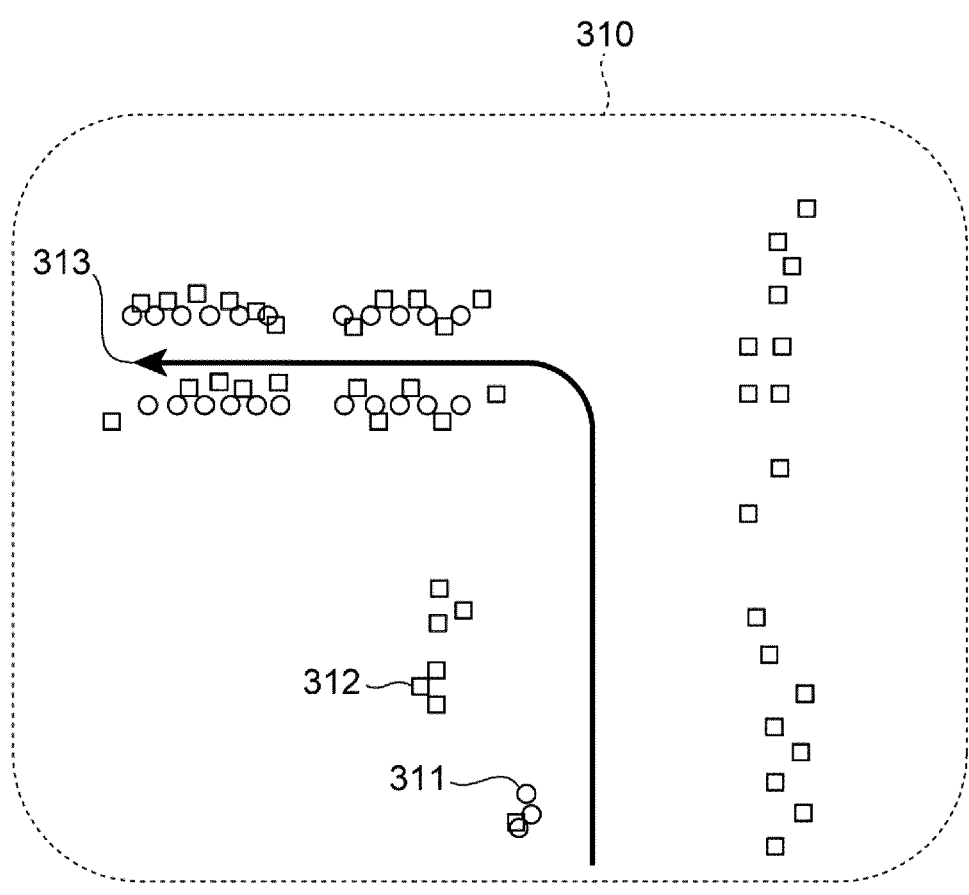
FIG. 3 is a diagram illustrating an example of a map 310 created by a map creation unit 110.

FIG. 3 is a diagram illustrating an example of a map 310 created by the map creation unit 110. FIG. 3 illustrates the map 310 created by the map creation unit 110 in the environment illustrated in FIG. 2. The map 310 includes a point group 311 acquired by the first external environment sensor 210 (sonar in this example), a point group 312 acquired by the second external environment sensor 220 (motion stereo for the image of the peripheral vision camera in this example), and a travelling location 313 acquired by the relative location sensor 230.

The point groups 311 and 312 are a set of points obtained as a result of detecting (measuring) an object around the ego vehicle by the external environment sensor while the vehicle 300 is travelling.

The travelling location 313 is the location and attitude of the vehicle 300 at each time point obtained by the relative location sensor 230 with the location and attitude of the vehicle 300 at a certain time point as the origin of the coordinate system.

The point group 311 acquired by the first external environment sensor 210 and the point group 312 acquired by the second external environment sensor 220 are acquired in a manner that the three-dimensional location of an object based on the sensor acquired by each external environment sensor is converted into the same coordinate system as the travelling location 313 by using the attachment location/attitude of the sensor with respect to the vehicle and the travelling location 313 at the time point at which the sensor has measured the point group. That is, the point group 311, the point group 312, and the travelling location 313 have locations and location/attitudes in the same coordinate system.

Furthermore, the point group 311, the point group 312, and the travelling location 313 may have locations and location/attitudes in a three-dimensional space, or may have locations and location/attitudes in a two-dimensional space. When the three-dimensional space is used, it is possible to estimate a height and a pitch that are not expressed in the two-dimensional space. On the other hand, when the two-dimensional space is used, it is possible to reduce the data capacity of the map 310.

(Operation of Required Accuracy Determination Unit)

Next, the contents of processing in the required accuracy determination unit 120 will be described with reference to FIGS. 4 to 7. The required accuracy determination unit 120 determines location/attitude estimation accuracy (required accuracy) required for self-location estimation in the next travel, from the output of the sensor 200 and the map 310 created by the map creation unit 110.

For example, the required accuracy determination unit 120 determines the required accuracy at each time point of the travelling location 313. In addition, for example, the required accuracy determination unit 120 determines the required accuracy by two values of high and low location/attitude estimation accuracy required for self-location estimation in the next travel. Note that a determination timing and a determination criterion of the required accuracy are not limited to the above description. The required accuracy may not be determined at all the time points (points) of the travelling location 313, or the required accuracy may be determined by a value other than a binary value as long as the level of the location/attitude estimation accuracy can be determined.

Figure 4:
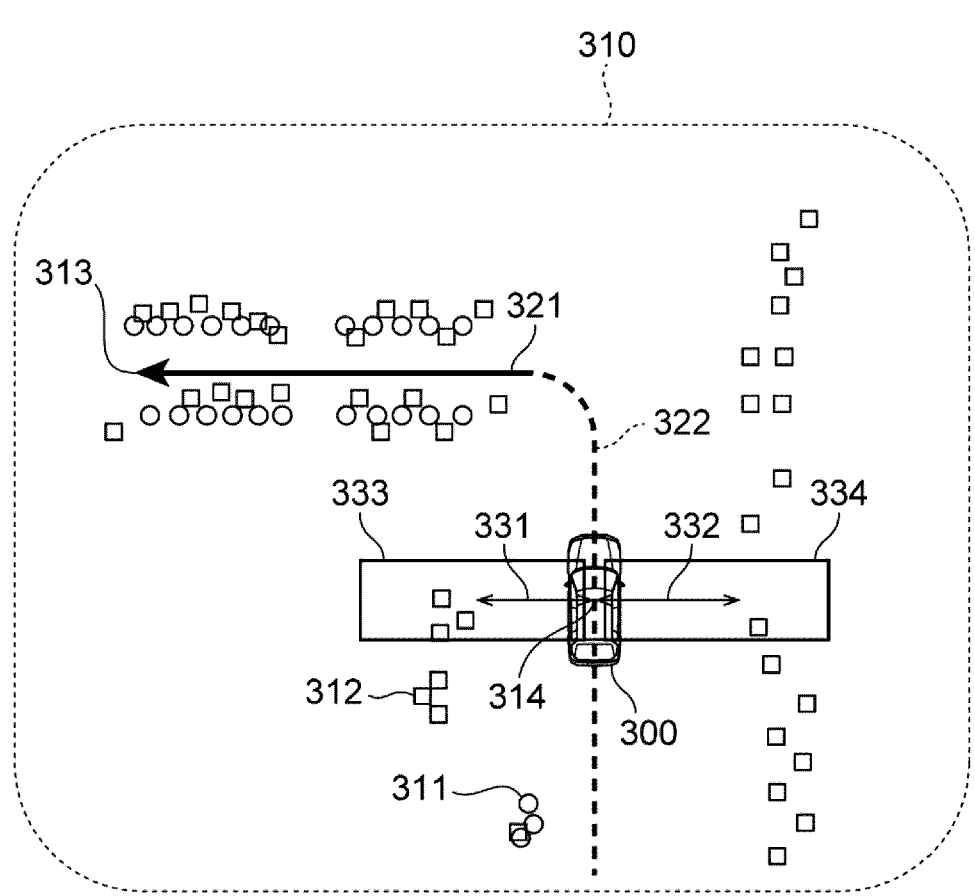
FIG. 4 is a diagram illustrating an example of required accuracy determination using a point group 311 and a point group 312.

FIG. 4 is a diagram illustrating an example of required accuracy determination using the point group 311 and the point group 312. In FIG. 4, the required accuracy determination unit 120 determines the travelling location 313 to be either a travelling location 321 with high required accuracy (solid line portion of the travelling location 313) or a travelling location 322 with low required accuracy (broken line portion of the travelling location 313).

In the required accuracy determination using the point group 311 and the point group 312, the required accuracy is determined by using a distance 331 to the point group on the left side of the vehicle 300 and a distance 332 to the point group on the right side of the vehicle 300, from a travelling location 314 at each time point. The distance 331 to the point group on the left side of the vehicle 300 and the distance 332 to the point group on the right side of the vehicle 300 are distances from the travelling location 314 at each time point to a point having the closest distance from the vehicle 300 among points included in search ranges 333 and 334 set in advance for the vehicle 300. When the sum of the distances 331 and 332 is smaller than a threshold value set in advance, the required accuracy is determined to be high, and otherwise, the required accuracy is determined to be low. That is, when the distance to an obstacle is short, it is determined that highly accurate self-location estimation and control are necessary to realize driving assistance and automatic driving using the map creation/self-location estimation device 100 in the next travel.

Figure 5:
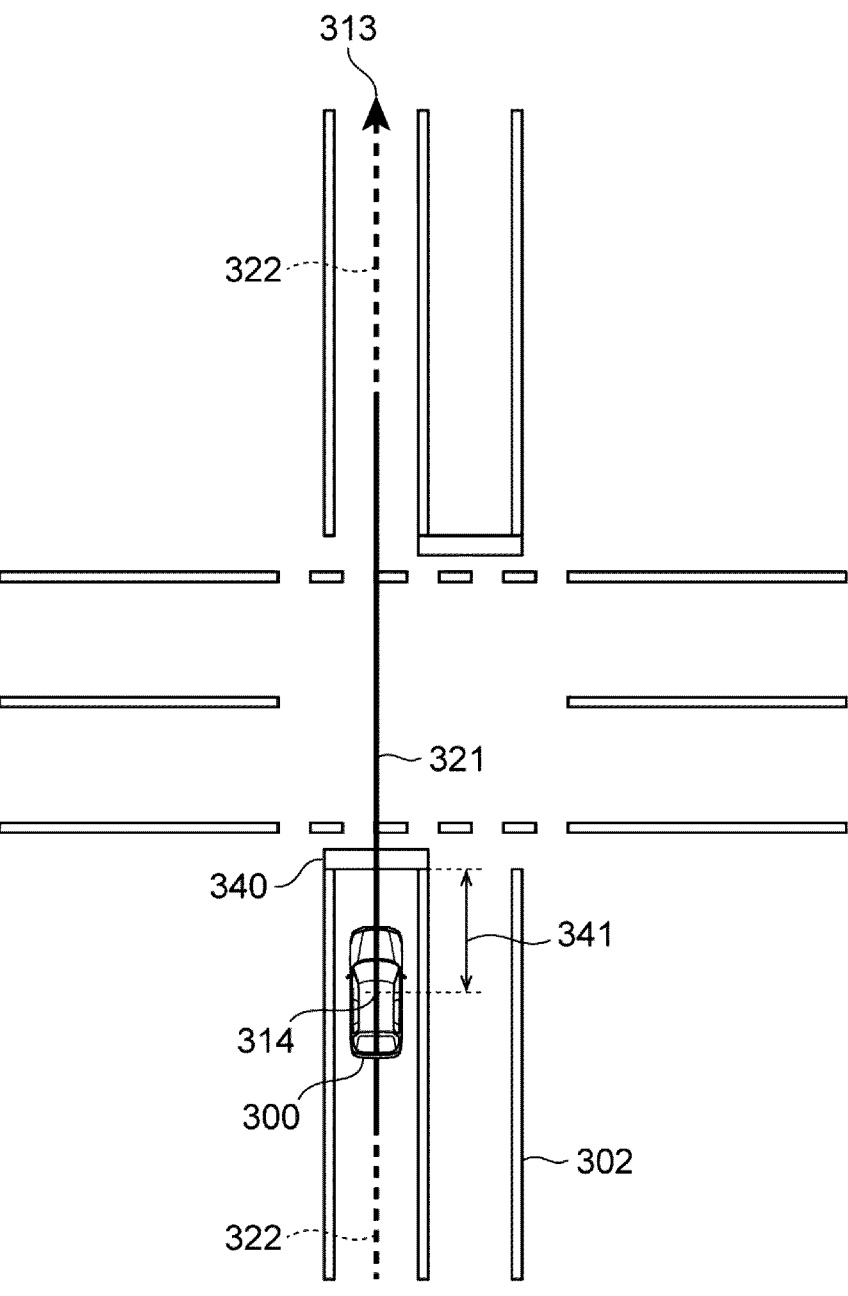
FIG. 5 is a diagram illustrating an example of required accuracy determination using a detection result of a target.

FIG. 5 is a diagram illustrating an example of required accuracy determination using a detection result of a target. In the required accuracy determination using the detection result of the target, the required accuracy is determined by using the location of the target detected by the first external environment sensor 210, the second external environment sensor 220, or another sensor. FIG. 5 illustrates a case where a temporary stop line 340 is used as the target. When the distance 341 from the travelling location 314 to the temporary stop line 340 at each time point is smaller than a threshold value set in advance, it is determined that the travelling location 321 (a solid line portion of the travelling location 313) has high required accuracy, and otherwise, it is determined that the travelling location 322 (a broken line portion of the travelling location 313) has low required accuracy. Here, the target is not limited to the temporary stop line 340, and a target such as a signal, a sign, a road sign, or an intersection may be used. That is, when the distance to a target that is important in control set in advance is short, it is determined that highly accurate self-location estimation and control are necessary to realize driving assistance and automatic driving using the map creation/self-location estimation device 100 in the next travel.

Figure 6:
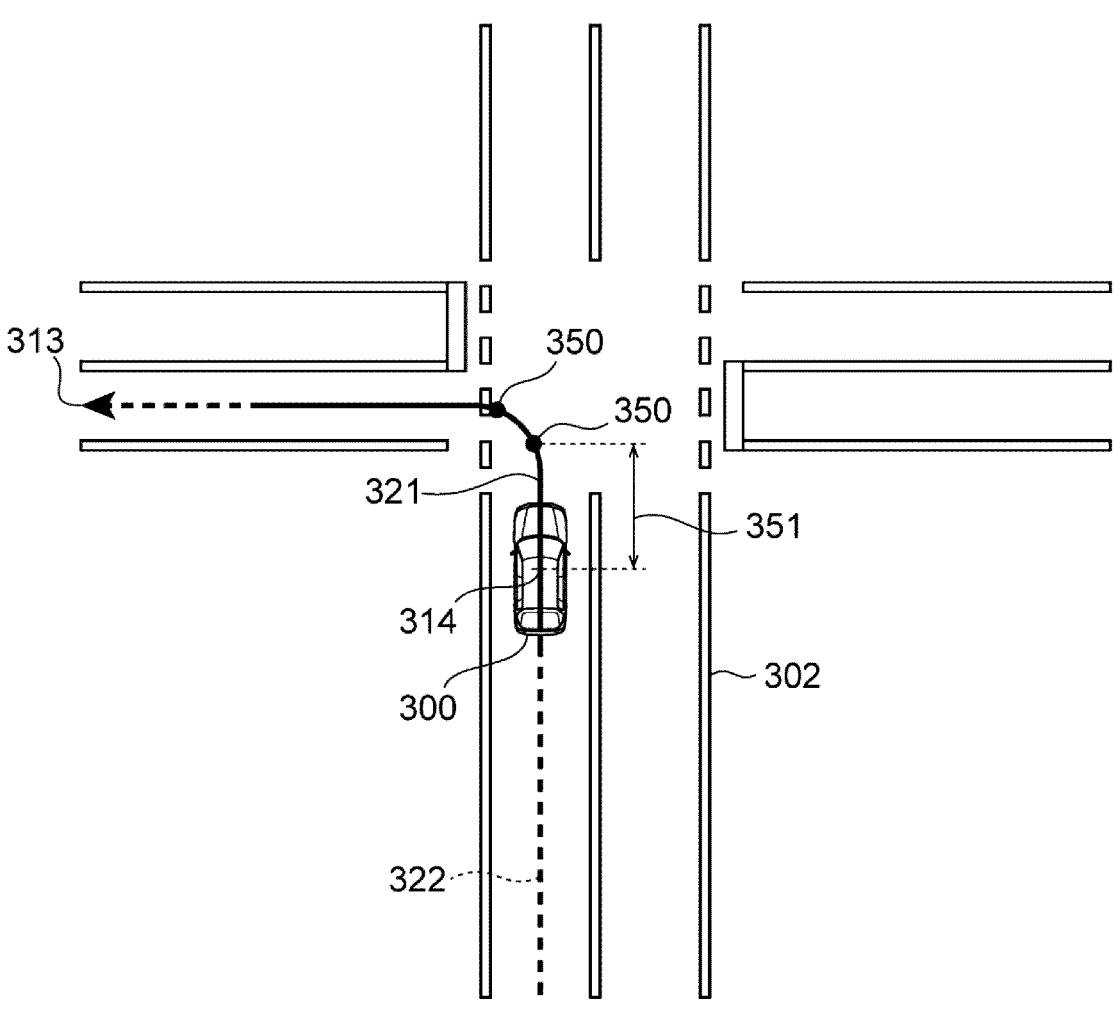
FIG. 6 is a diagram illustrating an example of required accuracy determination using a steering angular velocity as vehicle information.

FIG. 6 is a diagram illustrating an example of required accuracy determination using a steering angular velocity as the vehicle information. In the required accuracy determination using the vehicle information, the required accuracy is determined by using the vehicle information acquired from the vehicle information sensor 240. In the example using the steering angular velocity illustrated in FIG. 6, first, a location 350 at which the steering angular velocity is larger than a threshold value set in advance is detected. Then, when a distance 351 from the travelling location 314 to the location 350 at each time point is smaller than a threshold value set in advance, it is determined that the travelling location 321 (a solid line portion of the travelling location 313) has high required accuracy, and otherwise, it is determined that the travelling location 322 (a broken line portion of the travelling location 313) has low required accuracy. When there are a plurality of (two in FIG. 6) locations 350 where the steering angular velocity is larger than the threshold value set in advance, the distance 351 is calculated from the location 350 having the closest distance to the travelling location 314 at each time point. Here, the vehicle information is not limited to the steering angular velocity, and the brake amount, the speed, the acceleration, the angular velocity, the angular acceleration, the shift location change, the turning-on of a direction indicator, and the turning-on of a hazard lamp of the vehicle may be used as the vehicle information. That is, at a point where the driving operation of the driver who is travelling or the behavior change of the vehicle according to the driving operation is large, it is determined that highly accurate self-location estimation and control are necessary in order to realize the driving assistance/automatic driving using the map creation/self-location estimation device 100 in the next travel.

Figure 7:
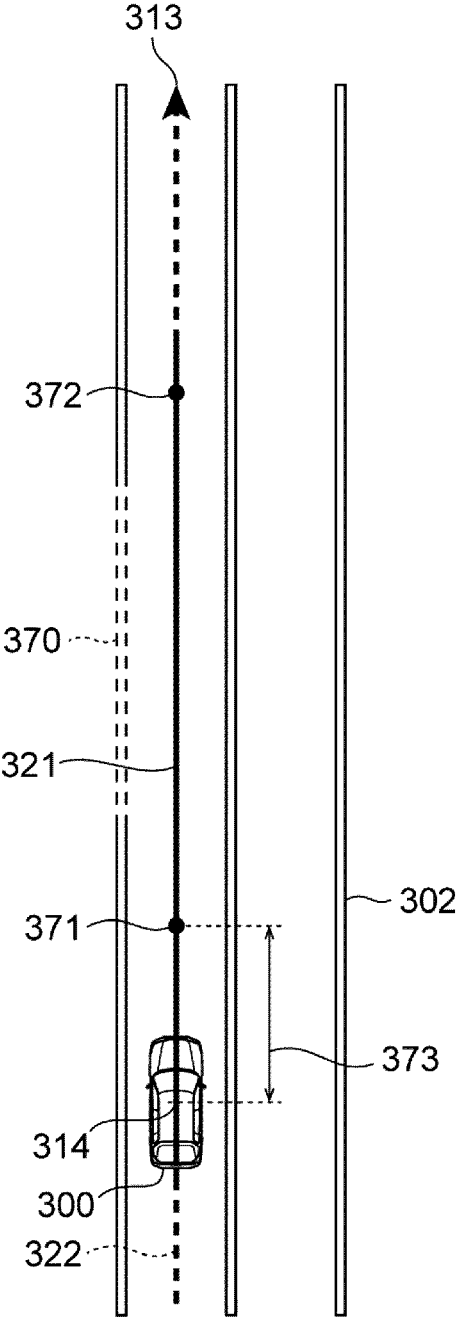
FIG. 7 is a diagram illustrating an example of required accuracy determination using an operation status of a driving assistance system as the vehicle information.

FIG. 7 is a diagram illustrating an example of required accuracy determination using the operation status of the driving assistance system as the vehicle information. In a situation where a lane keeping system which is one of the driving assistance systems is functioning, FIG. 7 illustrates a situation where a lane division line 370 is not recognized due to blurring or the like, and thus the lane keeping system is turned OFF (also referred to as cancellation) at a location 371, and, at a location 372, a lane division line 302 is recognized, and thus the lane keeping system is turned ON (also referred to as return). When the travelling location 314 is between the location 371 and the location 372 at each time point, it is determined that the travelling location 321 (a solid line portion of the travelling location 313) has high required accuracy. When a distance 373 from the travelling location 314 to the side closer to the location 371 and the location 372 at each time point is smaller than a threshold value set in advance, it is determined that the travelling location 321 (a solid line portion of the travelling location 313) has high required accuracy. Otherwise, it is determined that the travelling location 322 (a broken line portion of the travelling location 313) has low required accuracy. That is, in a section in which the driving assistance system is turned OFF during travelling, it is determined that highly accurate self-location estimation and control are necessary to realize driving assistance using the map creation/self-location estimation device 100 in the next travel.

Here, as the threshold value for each distance, a different threshold value may be used for each target or each type of vehicle information. In addition, the threshold value may be changed in accordance with whether the travelling location 314 at each time point is located on the front side or on the back side from the location detected by each target or each type of vehicle information. In addition, a time point may be used instead of or in addition to the location.

The required accuracy determination unit 120 may determine the final required accuracy by combining a plurality of determination indexes as described above. For example, a location having N or more indices determined as the travelling location 321 having high required accuracy may be finally determined as the travelling location 321 having high required accuracy. Here, N is an integer of 1 or more.

(Operation of Data Selection Unit)

Next, contents of processing in the data selection unit 130 will be described with reference to FIGS. 8 and 9. The data selection unit 130 selects a point group included in the map from the map 310 created by the map creation unit 110 and the required accuracy. Here, the required accuracy determined by the required accuracy determination unit 120 is used in the map creation mode, and the required accuracy included in the record map recorded in the map recording unit 140 is used in the location estimation mode. In addition, the data selection unit 130 creates a selection map including the selected point group (selection point group), the travelling location, and the required accuracy.

The data selection unit 130 in the present embodiment selects map data (point group) corresponding to the type of sensor that has measured the point group or the processing method from the map 310 created by the map creation unit 110 in accordance with the required accuracy, and creates a selection map. In other words, the data selection unit 130 selects data (point group) of the sensor of the type or the processing method corresponding to the above-described required accuracy among the sensors that have measured the point group, from the map 310 created by the map creation unit 110 (together with the travelling location of the ego vehicle and the required accuracy at a predetermined point of the travelling location of the ego vehicle), and creates the selection map.

Figure 8:
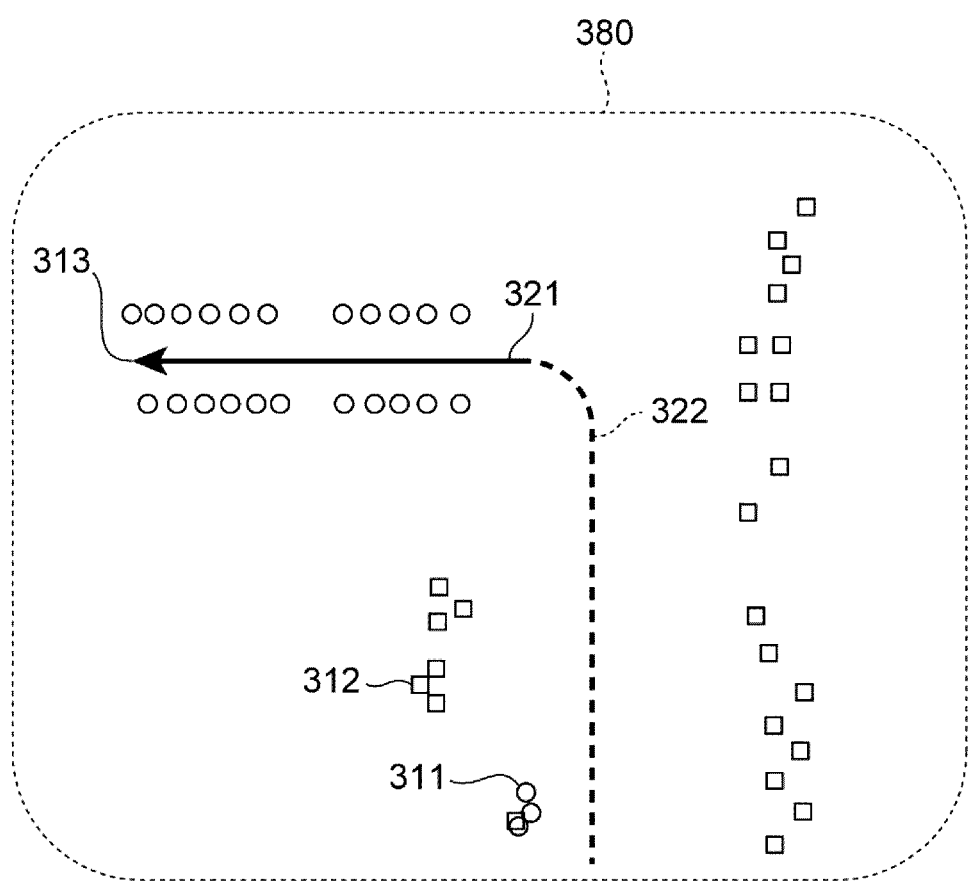
FIG. 8 is a diagram illustrating an example of a selection map 380 selected by a data selection unit 130.

FIG. 8 is a diagram illustrating an example of a selection map 380 selected by the data selection unit 130. FIG. 8 illustrates a result (selection map 380) of selecting data by using the map 310 illustrated in FIG. 3 and the determination result (travelling location 321 having high required accuracy and travelling location 322 having low required accuracy) of the required accuracy illustrated in FIG. 4. When the travelling location 314 at each time point is the travelling location 321 having high required accuracy, the data selection unit 130 selects only the point group 311 acquired by the first external environment sensor 210 (sensor having high measurement accuracy of a three-dimensional location) at this location, and does not select the point group 312 acquired by the second external environment sensor 220 (sensor having low measurement accuracy of a three-dimensional location). When the travelling location 314 at each time point is the travelling location 322 having low required accuracy, the data selection unit 130 selects both the point group 311 acquired by the first external environment sensor 210 and the point group 312 acquired by the second external environment sensor 220 at this location. That is, the data selection unit 130 uses only the point group (information) acquired from the external environment sensor having high measurement accuracy of a three-dimensional location (as compared with the travelling location having low required accuracy on the map) at the travelling location having high required accuracy on the map.

When the required accuracy included in the record map recorded in the map recording unit 140 is used in the location estimation mode, the travelling location 314 at each time point on the map 310 created during travelling of the ego vehicle is converted into the location/attitude on the record map by using the location/attitude estimated by the self-location estimation unit 150, and the determination result of the required accuracy for the travelling location on the closest record map is used.

In addition, the data selection unit 130 may also apply a known sampling method such as grid sampling. FIG. 9 is a diagram illustrating an example of grid sampling. In grid sampling, a grid having a size set in advance is set, and only one point is selected in each grid to reduce the number of points. Note that an average or a median of points in each grid may be selected as a point. Here, the data selection unit 130 performs sampling of the point group in accordance with the required accuracy. That is, the data selection unit 130 separately sets a grid 385 for the point group measured at the travelling location 321 having high required accuracy and a grid 386 for the point group measured at the travelling location 322 having low required accuracy. Then, the data selection unit 130 makes the size of each grid of the grid 386 larger than the size of each grid of the grid 385. In addition, the data selection unit 130 dynamically determines the size of the grid in accordance with the capacity (that is, the maximum capacity of the record map set in advance) that can be used for recording the map, and performs sampling of the point group. For example, first, the sizes of the grid 385 and the grid 386 are set to the same value. Then, the size of the grid 386 is gradually increased, and the size when the capacity of the map becomes equal to or less than the maximum capacity of the map, which is set in advance, is adopted. As a result, it is possible to preferentially leave a point measured at the travelling location 321 having high required accuracy (in other words, the number of points measured at the travelling location 322 having low required accuracy is reduced.) while suppressing the capacity of the map to be equal to or less than the maximum capacity defined by hardware or system constraints.

(Operation of Map Recording Unit)

The map recording unit 140 records, as the record map, a selection map including the point group (selection point group) selected by the data selection unit 130, the travelling location, and the required accuracy. Instead of the selection map or in addition to the selection map, a map that is created by the map creation unit 110 and includes the travelling location (travelling route) of the ego vehicle and a point group which is a measurement result of an object around the ego vehicle may be recorded as the record map (for example, in association with the required accuracy).

(Operation of Self-Location Estimation Unit)

Next, contents of processing in the self-location estimation unit 150 will be described with reference to FIG. 10. The self-location estimation unit 150 estimates the current location/attitude of vehicle (during travelling) on the record map by associating (comparing) the selection map 380 (record map) recorded in the map recording unit 140 with the selection map 380 (current map) created from the output of the current sensor 200 (travelling).

Figure 10:
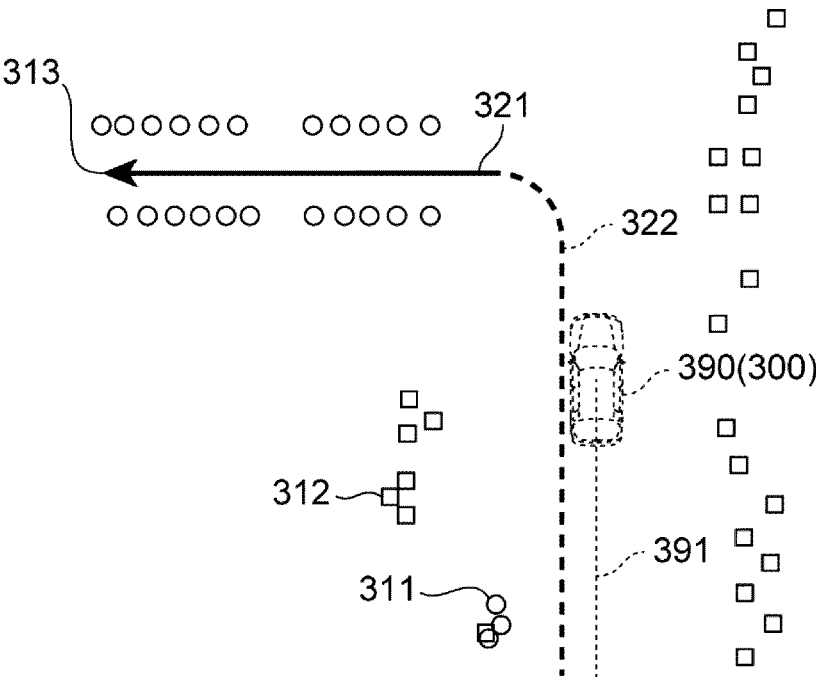
FIG. 10 is a diagram illustrating an example of a location/attitude of an ego vehicle estimated by a self-location estimation unit 150.

FIG. 10 is a diagram illustrating an example of the location/attitude of the ego vehicle estimated by the self-location estimation unit 150. In FIG. 10, the point group 311, the point group 312, the travelling location 313, and the determination result of the required accuracy (travelling location 321 having high required accuracy and travelling location 322 having low required accuracy) represent data of the record map. The self-location estimation unit 150 estimates the current location/attitude 390 and the current travelling location (travelling route) 391 of an ego vehicle 300 on the record maps.

The self-location estimation unit 150 obtains the location/attitude between the record map and the current map by associating the point group 311 and the point group 312 included in each map. A known iterative closest point (ICP) method or normal distributions transform (NDT) method is used to estimate the location/attitude by the association of the point group. When the location/attitude between the record map and the current map is used, it is possible to convert the location/attitude on the map into the location/ attitude on the other map. Therefore, by converting the travelling location 313 included in the current map into the location/attitude on the record map by using the location/attitude between the record map and the current map, it is possible to obtain the current location/attitude 390 and the current travelling location (travelling route) 391 of the ego vehicle 300 on the record map.

In the ICP method and the NDT method, the estimation of the location/attitude fails (the error becomes very large) when the number of points to be input is small or when the points are fixed in a portion of the space. On the other hand, when a point with low accuracy is input, the accuracy of the location estimation decreases. Since the self-location estimation unit 150 uses the point group selected by the data selection unit 130, at the travelling location 322 where the required accuracy for location estimation is low, by using both the point group 311 acquired by the first external environment sensor 210 (sensor with high measurement accuracy of the three-dimensional location) and the point group 312 acquired by the second external environment sensor 220 (sensor with low measurement accuracy of the three-dimensional location), the number of points is increased, and the points are widely distributed in the space, so that it is possible to perform location estimation without failure. In addition, since only the point group 311 acquired by the highly accurate first external environment sensor 210 is used at the travelling location 321 where required accuracy for location estimation is high, it is possible to perform highly accurate location estimation.

In addition, in the ICP method and the NDT method, the closer the characteristics of the two input point groups are, the more accurate the estimation is possible. The current map used by the self-location estimation unit 150 includes a point group selected by the data selection unit 130 based on the required accuracy included in the record map. That is, since the criterion of data selection for the map by the data selection unit 130 matches between the current map and the record map in the location estimation mode, the self-location estimation unit 150 can estimate the location/attitude with high accuracy.

(Operational Effect)

According to the first embodiment described above, it is possible to obtain the following operational effects.

(1) The map creation/self-location estimation device 100 includes a map creation unit 110, a required accuracy determination unit 120, a data selection unit 130, a map recording unit 140, and a self-location estimation unit 150. The map creation unit 110 creates a map including the point group and the travelling location of the ego vehicle from the output of the sensor 200. The required accuracy determination unit 120 determines location/attitude estimation accuracy (required accuracy) required for self-location estimation in the next travel, from the output of the sensor 200 and the map created by the map creation unit 110. The data selection unit 130 selects a point group included in the map from the map created by the map creation unit 110 and the required accuracy determined by the required accuracy determination unit 120. The map recording unit 140 records, as the record map, a selection map including the point group selected by the data selection unit 130, the travelling location, and the required accuracy. The self-location estimation unit 150 estimates the current location/attitude of the vehicle on the record map by associating the record map recorded in the map recording unit 140 with the current map including the point group selected by the data selection unit 130 and the travelling location of the ego vehicle (FIG. 1). The data selection unit 130 selects only the point group acquired from the external environment sensor having high measurement accuracy of the three-dimensional location at the travelling location with high required accuracy, selects both the point group acquired from the external environment sensor having high measurement accuracy of the three-dimensional location and the point group acquired from the external environment sensor having low measurement accuracy of the three-dimensional location at the travelling location with low required accuracy, and selects the point group acquired from more external environment sensors than the travelling location with high required accuracy (FIG. 8). Therefore, in the travelling location where the required accuracy for location estimation is high, it is possible to perform location estimation with high accuracy by using only a point group with high accuracy (preferentially). In addition, in the travelling location where the required accuracy for location estimation is low, it is possible to perform location estimation in a wide range by using many point groups.

(2) The map recording unit 140 records the point group (selection map 380) selected by the data selection unit 130. Therefore, it is possible to reduce the capacity (data amount) of the record map.

(3) In the map creation mode, the data selection unit 130 selects data (point group) from the map by using the required accuracy determined by the required accuracy determination unit 120. In the location estimation mode, the data selection unit 130 selects data (point group) from the map created during travelling of the ego vehicle, by using the required accuracy included in the record map recorded in the map recording unit 140 (FIG. 1). Therefore, since the criteria of the data selection of the record map and the current map used by the self-location estimation unit 150 match with each other in the location estimation mode, it is possible to estimate the location/attitude with high accuracy.

Figure 9:
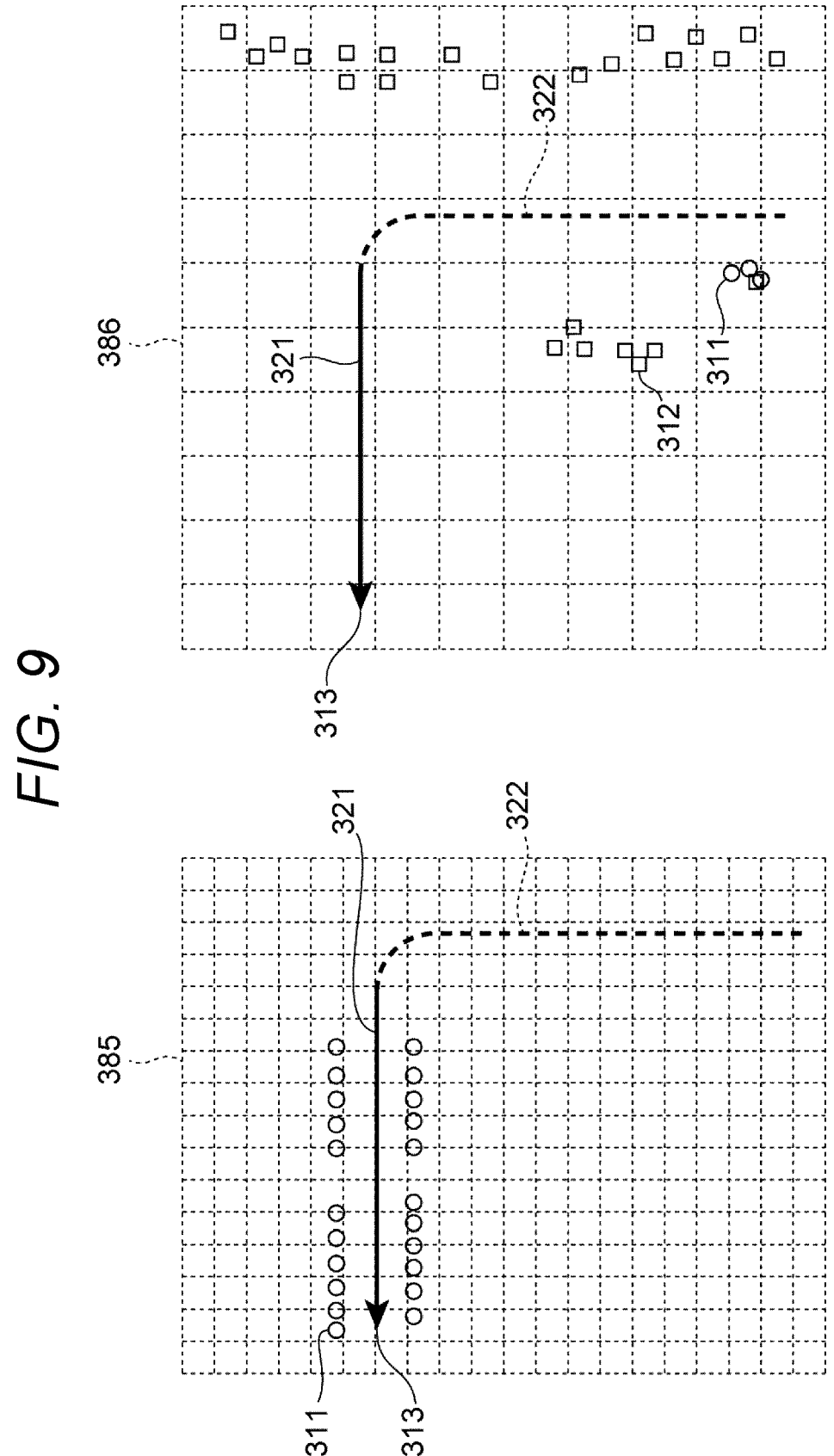
FIG. 9 is a diagram illustrating an example of grid sampling.

(4) The data selection unit 130 reduces the number of points by sampling the point group in accordance with the required accuracy (FIG. 9). Therefore, it is possible to reduce the capacity of the record map while preferentially leaving the point group measured at the travelling location 321 with high required accuracy.

(5) The data selection unit 130 reduces the number of points by sampling the point group in accordance with the maximum capacity of the record map, which is set in advance. Therefore, it is possible to suppress the capacity of the map to be equal to or less than the maximum capacity determined by hardware or system constraints.

(6) In the map creation mode, the map creation/self-location estimation device 100 operates the required accuracy determination unit 120, the data selection unit 130, and the map recording unit 140 offline only once when the map creation mode is ended. The selection map is recorded as the record map in the map recording unit 140. Therefore, it is possible to reduce the calculation cost of online processing that requires the periodic processing. In addition, since the entire map is used, the required accuracy determination unit 120 can determine the required accuracy at each time point of determining the required accuracy by using data of the sensor 200 at a time point before each time point. Therefore, it is possible to determine the required accuracy with high accuracy.

(7) When the distance from the travelling location of the ego vehicle to the point group is short, the required accuracy determination unit 120 determines that highly accurate self-location estimation and control are necessary (FIG. 4). Therefore, it is possible to estimate the location/attitude with high accuracy in an environment such as a narrow road where the distance to the obstacle is short.

(8) When the distance from the travelling location of the ego vehicle to a target set in advance (the target detected by the sensor 200) is short, the required accuracy determination unit 120 determines that highly accurate self-location estimation and control are necessary (FIG. 5). Therefore, it is possible to estimate the location/attitude with high accuracy when the vehicle stops on a temporary stop line or a signal.

(9) The required accuracy determination unit 120 determines the required accuracy by using the vehicle information such as the steering angular velocity (corresponding to the driving operation amount of the driver), the shift location, and the operation status of the driving assistance system that assists the driving operation of the driver (FIGS. 6 and 7). Therefore, it is possible to estimate the location/attitude with high accuracy in situations such as turning, the backward movement, and the operation of the driving assistance system.

As described above, the map creation/self-location estimation device 100 according to the first embodiment described above includes the map creation unit 110 that creates the map including the travelling location (travelling route) of the ego vehicle and the point group from pieces of information acquired by the plurality of sensors having different characteristics, the point group being a measurement result of the surrounding object of the ego vehicle, the required accuracy determination unit 120 that determines required accuracy of ego vehicle location (self-location) estimation at the predetermined point of the travelling location of the ego vehicle (in the next travel) based on the pieces of information acquired by the sensors and the map, the data selection unit 130 that selects, from the map, data of the map corresponding to a type of the sensor that measures the point group or a processing method, and creates a selection map in accordance with the required accuracy, the map recording unit 140 that records the map as the record map, and the self-location estimation unit 150 that estimates a current location of the ego vehicle in the record map by comparing the record map with the selection map created during travelling of the ego vehicle.

The data selection unit 130 preferentially selects the information acquired by the sensor having high location measurement accuracy among the plurality of sensors as compared with the travelling location having low required accuracy, at the travelling location having high required accuracy, and creates the selection map.

The data selection unit 130 selects information acquired by the sensor having high location measurement accuracy among the plurality of sensors and creates the selection map at the travelling location having high required accuracy, and selects both the information acquired by the sensor having the high location measurement accuracy among the plurality of sensors and information acquired by the sensor having low location measurement accuracy, and creates the selection map.

In addition, the map recording unit 140 further records the required accuracy for the record map (selection map), and the data selection unit 130 performs data selection for the map created during travelling of the ego vehicle, by using the required accuracy included in the record map.

More specifically, the map creation/self-location estimation device 100 according to the first embodiment described above includes, in a map creation mode, the map creation unit 110 that creates the map including the travelling location (travelling route) of the ego vehicle and the point group from the pieces of information acquired by the plurality of sensors having different characteristics, the point group being a measurement result of a surrounding object of the ego vehicle, the required accuracy determination unit 120 that determines the required accuracy of the ego vehicle location (self-location) estimation at the predetermined point of the travelling location of the ego vehicle (in the next travel) based on the pieces of information acquired by the sensors and the map, the data selection unit 130 that selects, from the map, the data of the map corresponding to the type of the sensor that measures the point group or the processing method, and creates the selection map in accordance with the required accuracy determined by the required accuracy determination unit 120, and the map recording unit 140 that records the map as the record map, and includes, in a location estimation mode, the map creation unit 110 that creates the map including the travelling location (travelling route) of the ego vehicle and the point group from the pieces of information acquired by the plurality of sensors having different characteristics, the point group being a measurement result of a surrounding object of the ego vehicle, the data selection unit 130 that selects, from the map, the data of the map corresponding to the type of the sensor that measures the point group or the processing method, and creates the selection map during travelling of the ego vehicle in accordance with the required accuracy included in the selection map (record map) recorded in the map recording unit 140, and the self-location estimation unit 150 that estimates the current location of the ego vehicle in the record map by comparing the selection map created during travelling of the ego vehicle with the selection map recorded in the map recording unit 140.

According to the first embodiment described above, it is possible to realize a map creation/self-location estimation device 100 in which, for example, in automatic driving and driving support required to operate in a wider range and under more various conditions as compared with automatic parking, it is necessary to achieve both improvement in self-location estimation accuracy and expansion of a self-location estimatable section, but it is possible to estimate the location/attitude of the ego vehicle with high accuracy.

Second Embodiment

A map creation/self-location estimation device according to a second embodiment will be described below with reference to FIG. 11. In the following description, the same components as those of the first embodiment are denoted by the same reference signs, and differences will be mainly described. The points not specifically described are the same as those in the first embodiment. In the present embodiment, in addition to the map creation/self-location estimation device 100 in the first embodiment, a map creation/self-location estimation device including a data temporary storage unit that temporarily stores sensor data and an offline map creation unit that creates a map by offline processing from the data stored in the data temporary storage unit is targeted.

(Block Configuration)

Figure 11:
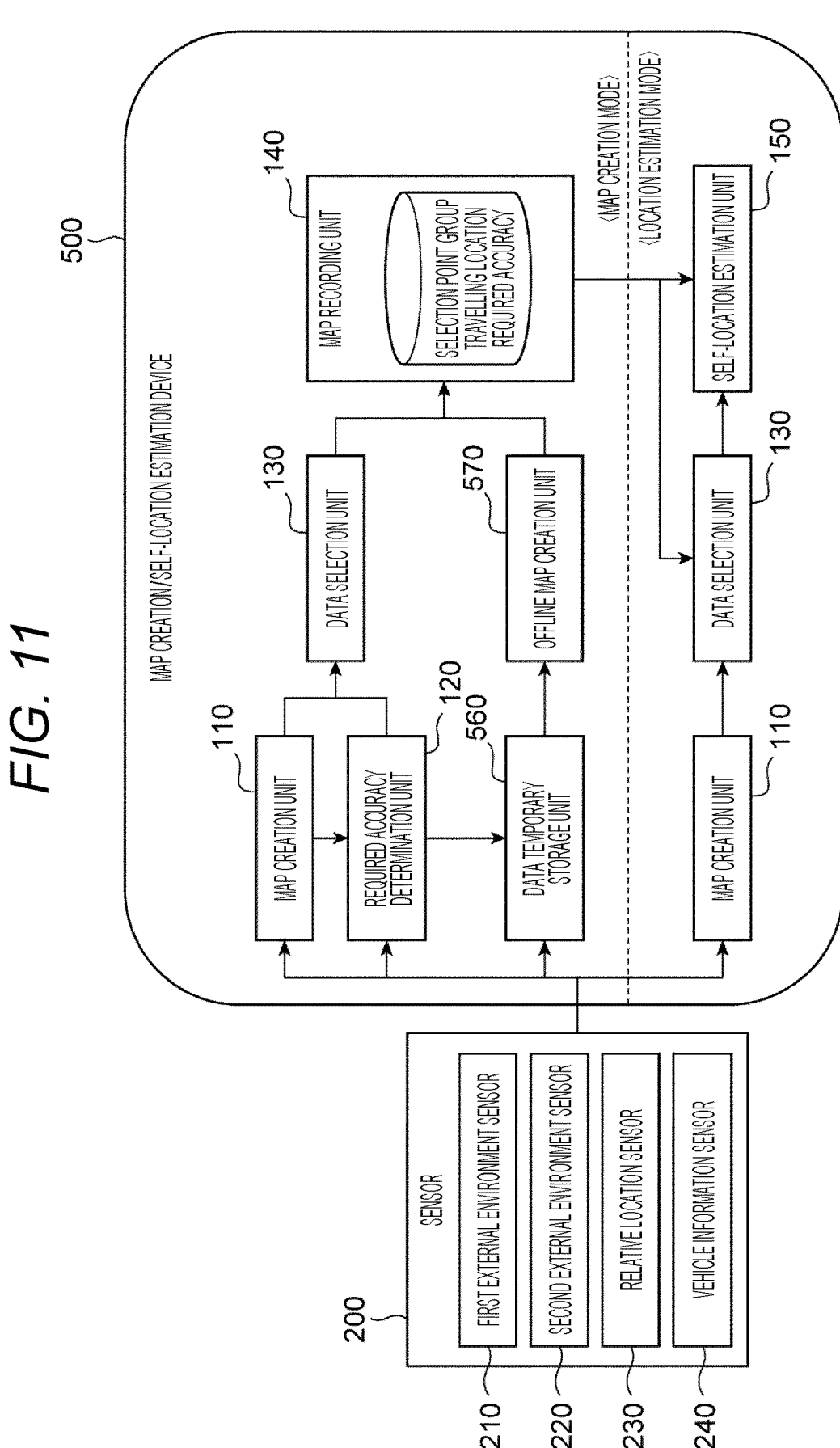
FIG. 11 is a diagram illustrating a block configuration of a map creation/self-location estimation device 500 according to a second embodiment.

FIG. 11 is a diagram illustrating a block configuration of a map creation/self-location estimation device 500 according to the second embodiment. The map creation/self-location estimation device 500 includes a map creation unit 110, a required accuracy determination unit 120, a data selection unit 130, a map recording unit 140, a self-location estimation unit 150, a data temporary storage unit 560, and an offline map creation unit 570. The data temporary storage unit 560 temporarily stores the data of the sensor 200 (online processing). The offline map creation unit 570 creates a map by offline processing from the data stored in the data temporary storage unit 560.

(Operation of Data Temporary Storage Unit)

Contents of processing in the data temporary storage unit 560 will be described. The data temporary storage unit 560 temporarily stores the data of the sensor 200.

The data temporary storage unit 560 operates in the map creation mode, and temporarily stores the data of the sensor 200 acquired at the travelling location 321 determined to be the travelling location 313 having high required accuracy by the required accuracy determination unit 120. Here, the data of the first external environment sensor 210 and the second external environment sensor 220 is not limited to the point group, and may be the output of each sensor before processing. For example, when motion stereo for the image of the peripheral vision camera is used as the second external environment sensor 220, the data temporary storage unit 560 may store the image of the peripheral vision camera in addition to the point group obtained by the motion stereo. The data stored in the data temporary storage unit 560 is stored until the operation of the offline map creation unit 570 is completed.

(Operation of Offline Map Creation Unit)

Next, contents of processing in the offline map creation unit 570 will be described. The offline map creation unit 570 creates a map by offline processing from the data stored in the data temporary storage unit 560.

The offline map creation unit 570 operates after it is determined that travelling in the map creation mode has ended, and creates a map by offline processing from the data of the sensor 200 at the travelling location 321 having high required accuracy, which is stored in the data temporary storage unit 560. The offline map creation unit 570 can create a map with higher accuracy than the map creation unit 110 by creating a map by offline processing. For example, when an image is stored in the data temporary storage unit 560, a known structure from motion (SfM) method of estimating the location/attitude of the camera and the three-dimensional location of a feature point from the image can be used. By using the SfM method, it is possible to obtain a highly accurate travelling location and point group from the travelling location estimated by the wheel odometry and the point group estimated by the motion stereo.

In addition, although the offline map creation unit 570 assumes online processing as an algorithm, the map may be created by an algorithm that is insufficient in processing time and cannot be operated by the map creation unit 110. For example, the map creation unit 110 may estimate the travelling location by the wheel odometry that can be processed at a high speed, and the offline map creation unit 570 may use image odometry for estimating the travelling location from the image or a visual simultaneous localization and mapping (SLAM) method of estimating the travelling location and the point group from the image.

Here, the map created by the map creation unit 110 and the map created by the offline map creation unit 570 are integrated as one map and recorded in the map recording unit 140. Specifically, the travelling location after the start point of the travelling location having high required accuracy is calculated by using the relative location/attitude from the start point estimated by the offline map creation unit 570. Similarly, the travelling location after the end point of the travelling location having high required accuracy is calculated by using the relative location/attitude from the end point obtained by the relative location sensor 230. As a result, it is possible to obtain the travelling location on one coordinate system by connecting the two different estimation results of the relative location/attitude.

Note that the operation of the offline map creation unit 570 may be performed after the ignition is turned OFF or after the driver gets off the vehicle. Furthermore, the offline map creation unit 570 does not need to operate continuously, and may perform processing little by little while the load of other processing is small.

(Operational Effect)

According to the second embodiment described above, it is possible to obtain the following operational effects.

(1) The offline map creation unit 570 operates when it is determined that travelling in the map creation mode has ended, and creates a map (a map including the travelling location of the ego vehicle and the point group which is a measurement result of objects around the ego vehicle) by offline processing from the data of the sensor 200 stored in the data temporary storage unit 560. Therefore, it is possible to obtain a highly accurate map by creating the map by offline processing. Furthermore, by using a highly accurate map, it is possible to estimate the location/attitude with high accuracy in the location estimation mode.

(2) The data temporary storage unit 560 operates in the map creation mode, and temporarily stores the data of the sensor 200 acquired at the travelling location 321 determined to be the travelling location having high required accuracy by the required accuracy determination unit 120. Therefore, only the data of the sensor 200 acquired at the travelling location 321 having high required accuracy is stored, and the data of the sensor 200 acquired at the travelling location 322 having low required accuracy is not stored, so that it is possible to reduce the capacity required for temporarily storing the data.

As described above, according to the second embodiment described above, similar to the first embodiment, it is possible to realize a map creation/self-location estimation device 500 in which, for example, in automatic driving and driving support required to operate in a wider range and under more various conditions as compared with automatic parking, it is necessary to achieve both improvement in self-location estimation accuracy and expansion of a self-location estimatable section, but it is possible to estimate the location/attitude of the ego vehicle with high accuracy.

The present invention is not limited to the above embodiments, and various modification forms may be provided. For example, the above embodiment is described in detail in order to explain the present invention in an easy-to-understand manner, and the above embodiment is not necessarily limited to a case including all the described configurations. Other forms considered within the scope of the technical idea of the present invention are also included in the scope of the present invention. Further, some components in one embodiment can be replaced with the components in another embodiment, and the configuration of another embodiment can be added to the configuration of one embodiment. Regarding some components in the embodiments, other components can be added, deleted, and replaced. Some or all of the configurations, functions, processing units, processing means, and the like may be realized in hardware by being designed with an integrated circuit, for example. Further, the above-described respective components, functions, and the like may be realized by software by the processor interpreting and executing a program for realizing the respective functions. Information such as a program, a table, and a file, that realizes each function can be stored in a memory, a recording device such as a hard disk and a solid state drive (SSD), or a recording medium such as an IC card, an SD card, and a DVD.

REFERENCE SIGNS LIST

100 map creation/self-location estimation device (first embodiment)
110 map creation unit
120 required accuracy determination unit
130 data selection unit
140 map recording unit
150 self-location estimation unit
200 sensor group
210 first external environment sensor
220 second external environment sensor
230 relative location sensor
240 vehicle information sensor
310 map
380 selection map
500 map creation/self-location estimation device (second embodiment)
560 data temporary storage unit
570 offline map creation unit

The invention claimed is:

1. A map creation/self-location estimation device comprising:
  a memory having a program stored therein that, when executed by a processor, causes the processor to:
  in a map creation mode,
  create a map including a travelling location of a vehicle and a point group from pieces of information acquired by a plurality of sensors having different characteristics, the point group being a measurement result of a surrounding object of the vehicle;
  determine required accuracy of location estimation of the vehicle at a predetermined point of the travelling location of the vehicle based on the pieces of information acquired by the plurality of sensors and the map;
  select, in accordance with the required accuracy and from the map, a subset of the point group in the map corresponding to a type of one or more sensors, among the plurality of sensors, that have measured the point group to create a selection map; and
  record, as a record map, the selection map including the required accuracy; and
  in a location estimation mode,
  create a current map including a travelling location of the vehicle and a point group from pieces of information acquired by the plurality of sensors having the different characteristics;
  select, in accordance with the recorded required accuracy and from the current map, a subset of the point group in the current map corresponding to a type of one or more sensors among the plurality of sensors, that have measured the point group to create a current selection map; and estimate a current location of the vehicle in the record map by comparing the record map with the current selection map,
  wherein the processor is configured to select the subset of the point group in the map and in the current map by:
  selecting (i) only point group acquired by one or more first sensors having high location measurement accuracy at a traveling location having a high required accuracy, and (ii) both the point group acquired by the one or more first sensors and point group acquired by one or more second sensors having low location measurement accuracy at a traveling location having a low required accuracy.

2. The map creation/self-location estimation device according to claim 1, wherein the processor is further configured to perform sampling of the point group in accordance with the target required accuracy.

3. The map creation/self-location estimation device according to claim 2, wherein the processor is configured to perform sampling of the point group further in accordance with maximum capacity of the record map, which is set in advance.

4. The map creation/self-location estimation device according to claim 1, wherein, in the map creation mode, the processor is operated offline only once when the map creation mode is ended.

5. The map creation/self-location estimation device according to claim 1, wherein the processor is configured to determine the target required accuracy in accordance with a distance from the travelling location of the vehicle to the point group.

6. The map creation/self-location estimation device according to claim 1, wherein the processor is configured to determine required accuracy in accordance with a distance from the travelling location of the vehicle to a target.

7. The map creation/self-location estimation device according to claim 1, wherein the processor is configured to determine the required accuracy in accordance with vehicle information including at least one of a driving operation amount of a driver, a shift location, and an operation status of a driving assistance system that assists a driving operation of the driver.

8. The map creation/self-location estimation device according to claim 1, wherein the processor is further configured to:
  temporarily store sensor data acquired by the plurality of sensors; and
  create the map from the sensor data temporarily stored, by offline processing.

9. The map creation/self-location estimation device according to claim 8, wherein the processor is further configured to store data acquired at the travelling location having the high required accuracy among travelling locations of the vehicle.

* * * * *